(12) United States Patent
Trautman

(10) Patent No.: US 9,506,492 B2
(45) Date of Patent: Nov. 29, 2016

(54) HYDRAULIC ROD TENSIONING SYSTEM

(71) Applicant: Riverhawk Company, New Hartford, NY (US)

(72) Inventor: Timothy J. Trautman, East Aurora, NY (US)

(73) Assignee: Riverhawk Company, New Hartford, NY (US)

( * ) Notice: Subject to any disclaimer, the term of this patent is extended or adjusted under 35 U.S.C. 154(b) by 0 days.

(21) Appl. No.: 14/941,076

(22) Filed: Nov. 13, 2015

(65) Prior Publication Data

US 2016/0069373 A1    Mar. 10, 2016

Related U.S. Application Data

(63) Continuation of application No. 13/195,455, filed on Aug. 1, 2011, now Pat. No. 9,188,146.

(60) Provisional application No. 61/371,002, filed on Aug. 5, 2010.

(51) Int. Cl.
| | | |
|---|---|---|
| *E21B 19/00* | (2006.01) | |
| *F16B 31/04* | (2006.01) | |
| *B25B 29/02* | (2006.01) | |

(52) U.S. Cl.
CPC .............. *F16B 31/04* (2013.01); *B25B 29/02* (2013.01); *F16B 31/043* (2013.01); *Y10S 411/916* (2013.01)

(58) Field of Classification Search
CPC ...... F16B 31/04; F16B 31/043; B25B 29/02; Y10S 411/916
See application file for complete search history.

(56) References Cited

U.S. PATENT DOCUMENTS

| | | |
|---|---|---|
| 3,679,173 A | 7/1972 | Sherrick et al. |
| 3,867,895 A | 2/1975 | Ameigh |
| 4,074,890 A | 2/1978 | Boudet et al. |
| 4,079,914 A | 3/1978 | Boudet et al. |
| 4,246,810 A | 1/1981 | Keske |
| 4,438,901 A | 3/1984 | Reneau et al. |
| 4,523,742 A | 6/1985 | Reneau |
| 4,565,111 A | 1/1986 | Ecker et al. |
| 4,569,258 A | 2/1986 | Orban |
| 4,569,506 A | 2/1986 | Vassalotti |
| 4,581,956 A | 4/1986 | Robert |
| 4,598,897 A | 7/1986 | Aikioniemi |
| 4,604,918 A | 8/1986 | Aldred |
| 4,708,036 A | 11/1987 | Vossbrinck |
| 4,846,444 A | 7/1989 | Vassalotti |

(Continued)

*Primary Examiner* — Monica Carter
*Assistant Examiner* — Nirvana Deonauth
(74) *Attorney, Agent, or Firm* — Woods Oviatt Gilman LLP; Dennis B. Danella, Esq.

(57) ABSTRACT

A tensioning system for tensioning a stud is provided. The system includes an adapter ring having an external surface, an internal surface engaging the external surface of the stud or puller screw, and at least two bores defined therein. The posts have first and second ends and are disposed in the bores. The first ends are supported by a stop surface, and the second ends extend outwardly from the bores. A cylinder includes an internal surface engaged with the external surface of the adapter ring. First and second pistons are movably positioned within the cylinder with an intermediate cap disposed therebetween to define first and second hydraulic chambers. The first piston is configured for being supported by the second ends of the posts. The hydraulic chambers are hydraulically connected to one another, whereby providing a hydraulic fluid in the chambers operates to apply a tension force on the stud.

28 Claims, 8 Drawing Sheets

(56) References Cited

U.S. PATENT DOCUMENTS

| | | |
|---|---|---|
| 4,998,453 A | 3/1991 | Walton et al. |
| 5,408,509 A | 4/1995 | Ruzga et al. |
| 5,452,629 A | 9/1995 | Heiermann et al. |
| 5,468,106 A | 11/1995 | Percival-Smith |
| 6,065,737 A | 5/2000 | Richardson et al. |
| 6,077,008 A | 6/2000 | Elgh |
| 6,685,406 B2 | 2/2004 | Whitney et al. |
| 6,840,726 B2 | 1/2005 | Gosling |
| 7,140,824 B2 | 11/2006 | Bucknell |
| 7,275,462 B2 | 10/2007 | Faus et al. |
| 7,513,178 B2 | 4/2009 | Hohmann et al. |
| 7,661,336 B2 | 2/2010 | Hohmann et al. |
| 2003/0086770 A1* | 5/2003 | Whitney ............ F16B 31/04 411/14.5 |

\* cited by examiner

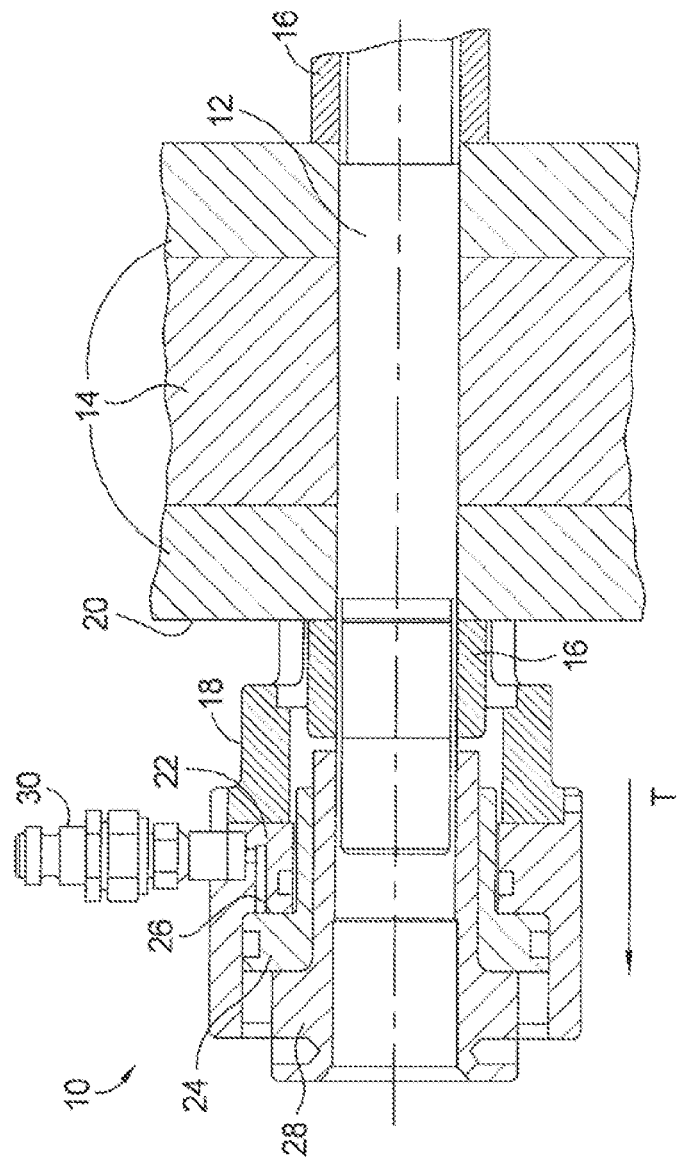
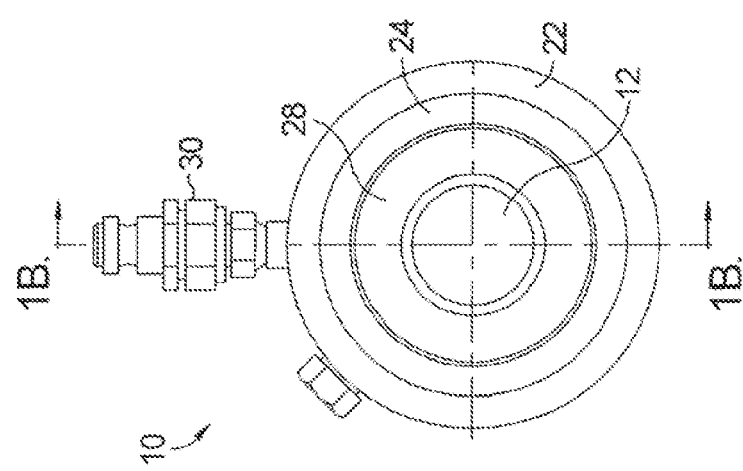
FIG. 1B (PRIOR ART)
FIG. 1A (PRIOR ART)

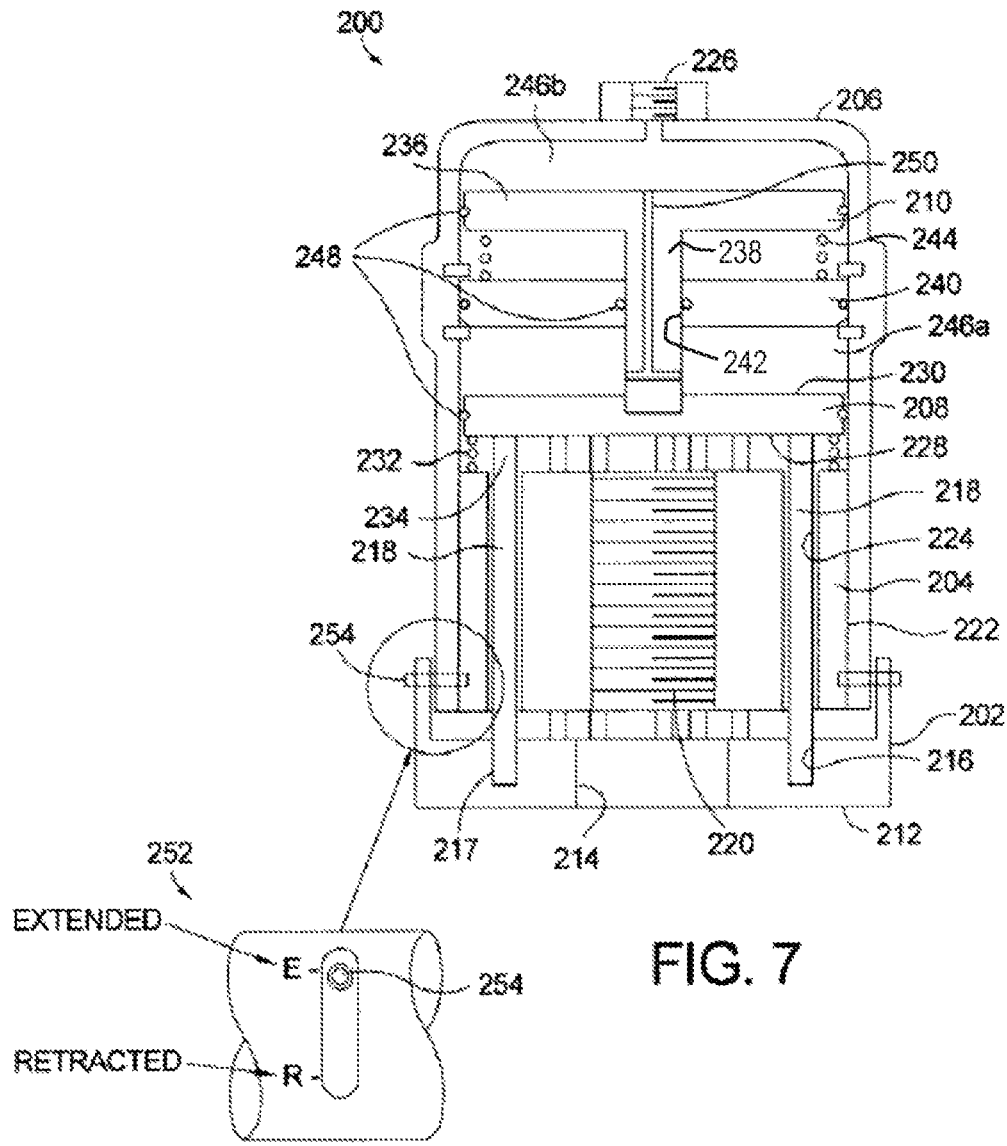

HYDRAULIC ROD TENSIONING SYSTEM

CROSS-REFERENCE TO RELATED APPLICATIONS

This application is a continuation of U.S. patent application Ser. No. 13/195,455, filed Aug. 1, 2011, now U.S. Pat. No. 9,188,146, which claims the benefit of U.S. Patent Application No. 61/371,002, filed Aug. 5, 2010. The content of U.S. patent application Ser. No. 13/195,455 and 61/371,002 are hereby incorporated by reference in their entirety.

FIELD OF THE INVENTION

The present invention generally relates to a system for tensioning an elongated fastening member, more particularly, to a hydraulic rod tensioning (HRT) system that operates to apply and retain tension to an elongated fastening member, such as, for example, a rod, stud, or bolt.

BACKGROUND OF THE INVENTION

Studs, bolts and rods may be tensioned in order to provide a secure mechanical connection between structural members, such as, for example, a pair of opposing flanges on a piece of machinery. The tensioning of a stud or bolt is typically accomplished by a tensioning system or device that applies an axially-directed force to the stud in a direction away from the structural member. The tensioning system generally includes a mechanism for gripping the stud and a load cell. An axially-directed force is applied by the load cell to the gripping mechanism. The gripping means transfers the force to the stud, and thereby axially tensions or stretches the stud. The stud is then mechanically retained in its stretched or tensioned position by, for example, a nut that threadingly engages external threads formed on the stud and which is tightened down to engage the flange.

Some conventional tensioning systems utilize mechanical load cells, whereas other tensioning systems use hydraulic load cells. Mechanical load cells convert mechanical pressure or force to the axial tensioning force, whereas hydraulic load cells convert hydraulic pressure to the axial tensioning force. Tensioning systems may be configured as either internal gripping, external gripping or integrated tensioning systems where the tensioner is integrated with the fastener.

Consistent with the description provide above, hydraulic tensioning systems typically include a hydraulic cylinder with a pulling feature, such as a puller nut, that attaches to the stud, and a reacting foot that presses against an exposed surface of the flange. An example of an existing hydraulic tensioning system can been seen in FIGS. 1A and 1B, which will be described in more detail below. While existing hydraulic tensioning systems may be effective in most applications, they suffer from a number of drawbacks and deficiencies. For example, existing hydraulic tensioning systems, such as the example provided in FIGS. 1A and 1B, include a hole or passage having an inner diameter that provides a space along the inner axis to allow the stud to be disposed therein so that the stud can be engaged with the tensioning system. However, one result of including such a hole or passage is a reduction of the hydraulic pressure area for a given tension system diameter. To account for this reduction in hydraulic pressure area, either tension load must be sacrificed, the tensioning system must be larger in diameter, the tensioning system must be longer to include additional cylinders, or the tensioning system must be designed for higher operating pressures, any one or combination of which may be undesirable options.

There are also instances in which a hydraulic tensioning system malfunctions or breaks when being used to apply an axial tension force on a stud. Given the high pressures that are used to apply the tension force on the stud, a malfunction or breakage of the tensioning system could potentially cause one or more of the parts of the tensioning system or the stud to be projected toward a user. Currently, there is no adequate mechanism for capturing these broken parts, thereby increasing the risk of a user being injured in such an event.

As such, there is a need for an improved hydraulic tensioning system that overcomes the drawbacks and deficiencies mentioned above. The present invention fulfills these and other needs.

SUMMARY OF THE INVENTION

In order to overcome the above stated problems, the present invention provides a tensioning system for tensioning a stud that projects from a structural member, wherein the stud has a central axis. The tensioning system may include a puller screw including first and second ends, wherein the first end is configured for selectively engaging the stud, and the second end includes an external surface having external threads defined therein. The tensioning system also includes a nut having an internal surface with threads defined therein and an external surface with threads defined therein, the internal surface is configured for engaging the external surface of the puller screw or the external surface of the stud if a puller screw is not used, and the nut includes at least two axial bores defined therein. The system further includes at least two posts, each of the posts have first and second ends and are disposed in a corresponding one of the at least two axial bores. Each of the first ends of the posts are configured for engaging a stop surface, and each of the second ends of the posts are disposed external to the at least two axial bores and extend axially beyond the second end of the puller screw in a direction away from the structural member. The system also includes a cylinder including an internal surface with threads defined therein configured for engaging the external surface of the nut, wherein the cylinder has a bore defined therein. At least one locking member is positioned within the bore of the cylinder, and is configured for engaging the nut to fixedly position the nut relative to the cylinder. A piston is movably positioned within the cylinder, and is engaged with the second ends of the at least two posts. Further, at least one spring may be disposed between the nut and the piston.

The present invention may further include a safety guard coupled with the cylinder and the stud. The safety guard may generally include a guard and a hydraulic interlock assembly. The guard may be coupled with the stud and the hydraulic interlock assembly, and the hydraulic interlock assembly may also be coupled with the cylinder to ensure that the safety guard is in an acceptable position.

The present invention may further comprise an intermediate cap fixedly positioned between the piston and the cylinder. The intermediate cap may include a bore defined therein, wherein the piston includes an extension member that is coupled with the piston and extends through the bore in the intermediate cap. As a result, a first hydraulic chamber may be defined between the piston and the intermediate cap, and a second hydraulic chamber may be defined between the extension member and the cylinder. Further, a return spring may be disposed between the intermediate cap and the extension member. The extension member may have a passage defined therein that is configured for allowing hydraulic fluid to pass between the first and second hydraulic chambers.

BRIEF DESCRIPTION OF THE DRAWINGS

The above-mentioned and other features and advantages of this invention, and the manner of attaining them, will become apparent and be better understood by reference to the following description of the invention in conjunction with the accompanying drawings, wherein:

FIG. 1A is a front view of a prior art hydraulic tensioning system;

FIG. 1B is a cross-sectional view of the prior art hydraulic tensioning system shown in FIG. 1A taken along line 1B-1B;

FIG. 7 is a cross-sectional view of another embodiment of the HRT system in accordance with the present invention.

BRIEF DESCRIPTION OF THE INVENTION

Figure 2:
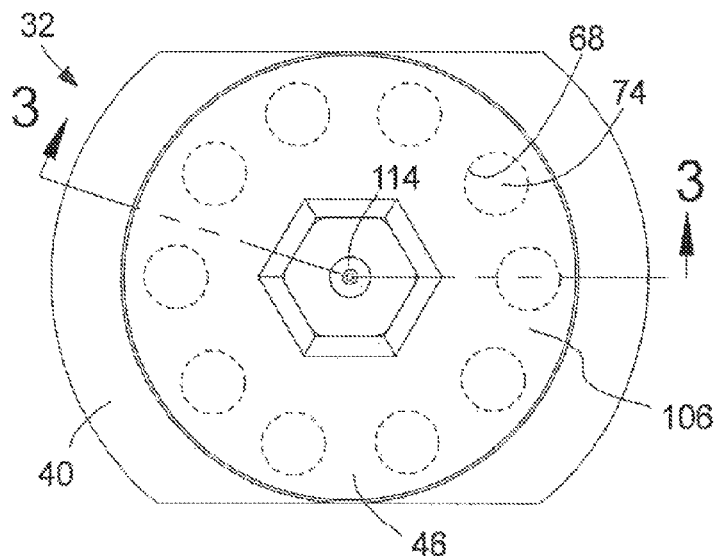
FIG. 2 is a top view of a HRT system in accordance with the present invention.

With reference to FIGS. 1A and 1B, an exemplary prior art hydraulic tensioning system 10 will initially be described so that its features can be distinguished from the features set forth in the present invention. As best seen in FIGS. 1A and 1B, a stud 12 is being used to fasten a plurality of flanges 14 together using a pair of nuts 16. In order to place stud 12 in tension, the nuts 16 are first threadably coupled to opposing ends of stud 12, and then prior art hydraulic tensioning system 10 is coupled to one end of stud 12. Next, a reaction foot 18 is placed on contact with the outer surface 20 of flange 14, wherein reaction foot 18 is positioned around both stud 12 and nut 16. A cylinder 22 is then placed in contact with a top surface of reaction foot 18, and a piston 24 is positioned adjacent to and within cylinder 22 to form a hydraulic chamber 26 therebetween. A puller nut 28 is then positioned within cylinder 22 so that puller nut 28 may be threadably attached to both the outer surface of stud 12 and the inner surface of piston 24.

In order to apply a tension force T to stud 12 in the prior art system shown in FIGS. 1A and 1B, fluid is introduced from a hydraulic source 30 into hydraulic chamber 26 forcing piston 24 to move axially away from flange 14. Since piston 24 and puller nut 28 are in a fixed relationship to one another, the axial force of piston 24 is translated through puller nut 28. Puller nut 28 subsequently applies the tension force to stud 12 thereby stretching stud 12 in the axial direction away from flange 14. As puller nut 28 is applying the axial tension force, nut 16 is tightened against flange 14 so that the tension force is maintained in stud 12 after the tensioning system 10 is removed. The prior art tensioning system 10 described above suffers from the drawbacks and deficiencies described above.

Figure 3A:
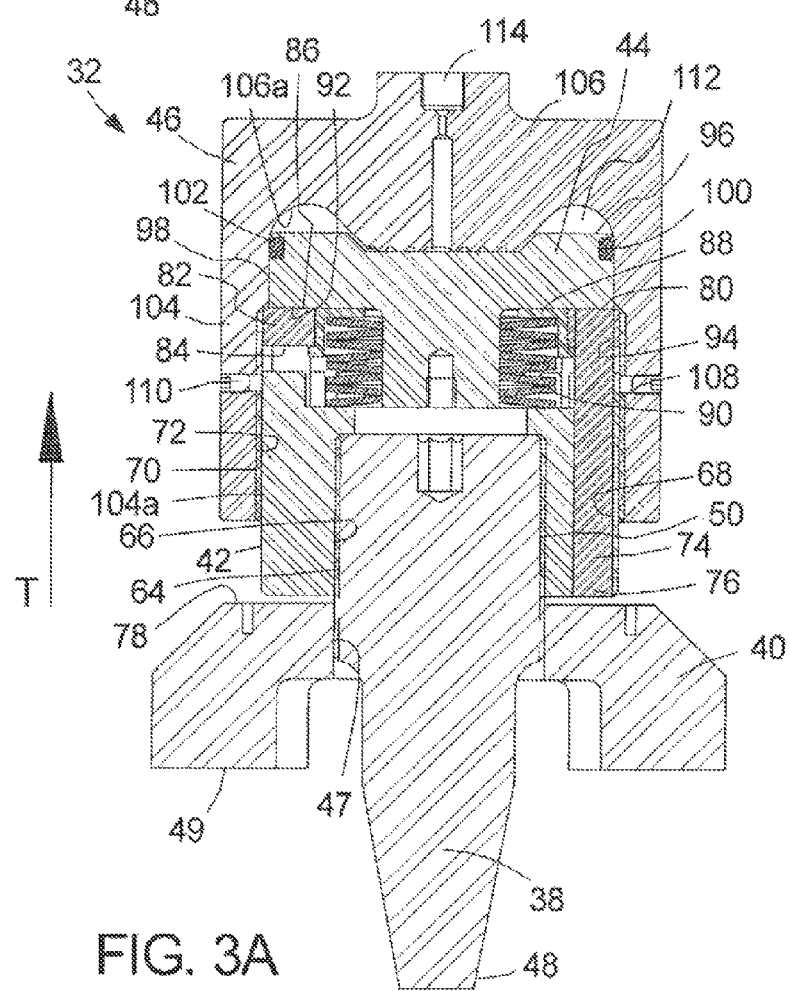
FIG. 3A is a cross-sectional view of the HRT system shown in FIG. 2 taken along line 3-3.

Referring now to FIGS. 2 and 3A, there is shown one embodiment of a hydraulic rod tensioning (HRT) system 32 of the present invention. With additional reference to FIG. 5, the HRT system 32 generally operates to couple a flange 14*a* together with, for example, an opposing flange 14*b* disposed on the side of the flange that is opposite the HRT system 32. A stud 12' extends through a bore 34*a* of flange 14*a* and through a corresponding bore 34*b* in the opposing flange 14*b*. It should be understood that stud 12' may have a cross-section of any shape, including, but not limited to, cylindrical, square, trapezoid, etc. The end of stud 12' extends from bore 34*b* in the opposing flange 14*b* and may be terminated by a nut 16*b* that engages the face of flange 14*b*. HRT system 32 stretches stud 12' in an axial direction away from flange 14*a* and maintains stud 12' in a tensioned/stretched condition by coupling stud 12' to flange 14*a*.

In one embodiment of the present invention, stud 12' has a central axis A, and includes internal threads 36 formed on at least a portion of the axial length thereof and extending from bore 34*a* in flange 14*a*, whereby HRT system 32 is configured to engage internal threads 36 of stud 12' to apply the tension force. It is also within the scope of the present invention to couple HRT system 32" with the external threads of a stud 12' as shown in FIG. 3C to apply a tension force thereto, which will be described in more detail below.

As best seen in FIGS. 2 and 3A, HRT system 32 may include a puller screw 38, a support foot 40, an integrated nut 42, a tensioner piston 44, and a tensioner cylinder 46. However, it should be understood that HRT system 32 need not include puller screw 38.

Figure 5:
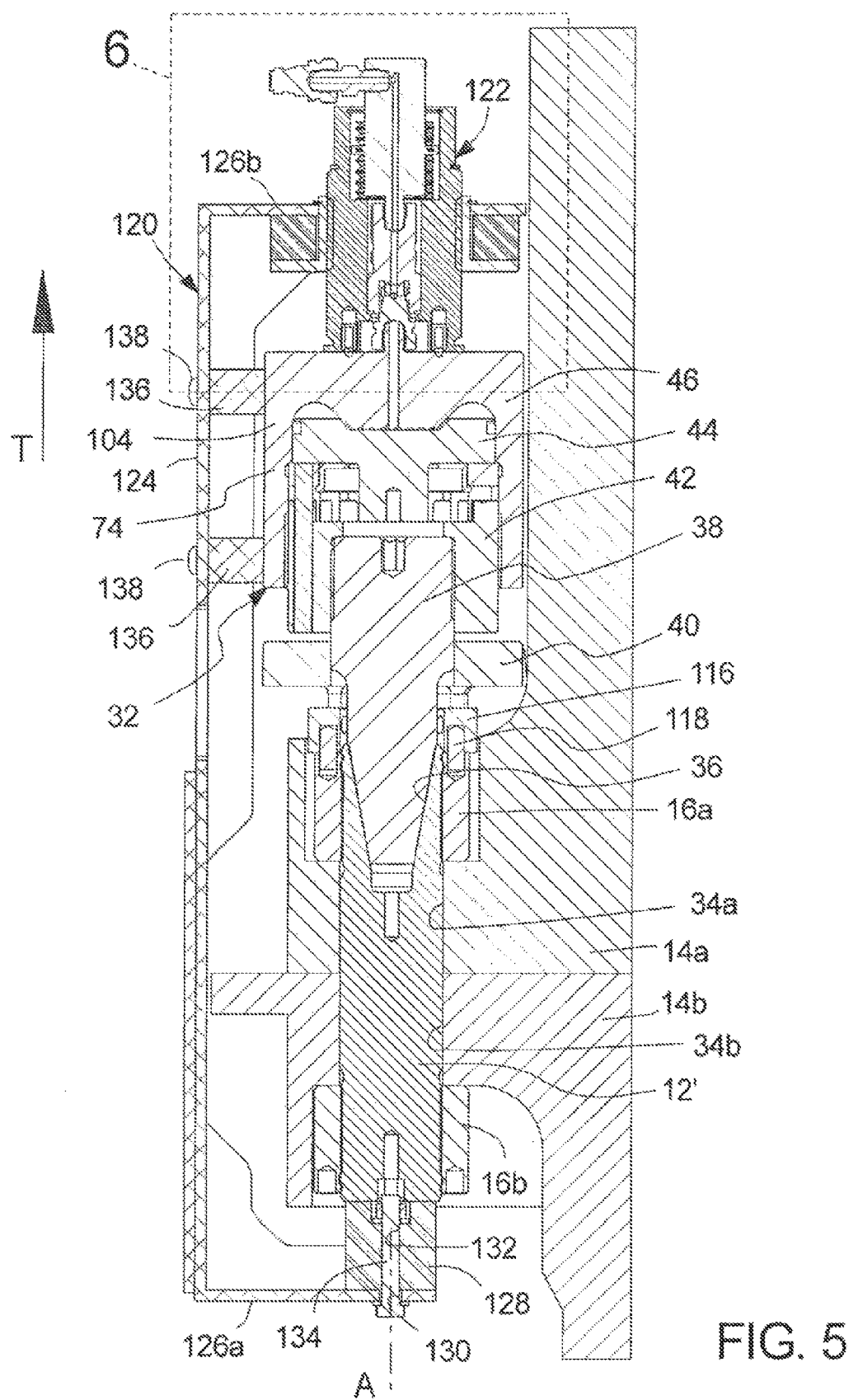
FIG. 5 is a cross-sectional view of another aspect of the present invention wherein the HRT system shown in FIGS. 2 and 3A is being used in conjunction with a safety guard.

As best seen in FIG. 3A, support foot 40 has a bore 47 defined therein configured for allowing puller screw 38 to be slidingly disposed therein, and when puller screw 38 is not utilized, for allowing a stud to be slidingly disposed therein. Support foot 40 includes a support surface 49 that is adapted to either directly or indirectly engage flange 14*a* (FIG. 5). Support foot 40 may be formed entirely, or partially, of a magnetic material so that the position of support foot 40 can be maintained on a sloped flange surface, thereby relieving the operator from having to hold support foot 40 in place during the insertion of puller screw 38, when used in the system 32, and during the assembly of the other portion of HRT system 32. It should be understood that the configuration of support foot 40 may vary depending on the flange type and is not limited to the configuration shown in FIG. 3A. Support foot 40 may further incorporate additional components, such as, for example, hooks, straps, and alignment features to assist in maintaining its position on the flange during the assembly and operation of HRT system 32. Further, it should be understood that support foot 40 and puller screw 38, when used in the system 32, are separable from the other portions of HRT system 32. The maximum lift weight of HRT system 32 is minimized by separating these components allowing them to be installed separately.

Puller screw 38 is configured to be slidably positioned within bore 47 of support foot 40, and includes first and second ends 48, 50. First end 48 is configured to engage HRT system 32 with stud 12' by itself or through the use of an additional fastener. For example, with additional reference to FIG. 5, first end 48 may be male-tapered and include a threaded feature that is adapted to thread into a female mating feature formed in inner diameter 36 of stud 12'. Puller screw 38 is a versatile component of HRT system 32 in that, instead of directly engaging the stud, puller screw 38 may also be used in conjunction with an additional fastener to engage the stud. This additional fastener is not necessarily included in HRT system 32 since this additional fastener may take many different forms depending on the type of stud to be engaged by HRT system 32. In another aspect, puller screw 38 can easily be removed from HRT system 32 and replaced with other puller screws with different configurations to accommodate engagement with the stud that will be placed in tension by HRT system 32. Therefore, HRT system 32 is versatile in that it can be used with different types of puller screws and/or additional fasteners to engage the HRT system 32 to a given stud. For example, first end 48 of puller screw 38 may also be configured with a female end (not shown but similar to 38' in FIG. 3B) that is adapted to engage thread 58 of an external tensioned nut (ETN) 52 (FIG. 4) to couple HRT system 32 to the stud.

Figure 4:
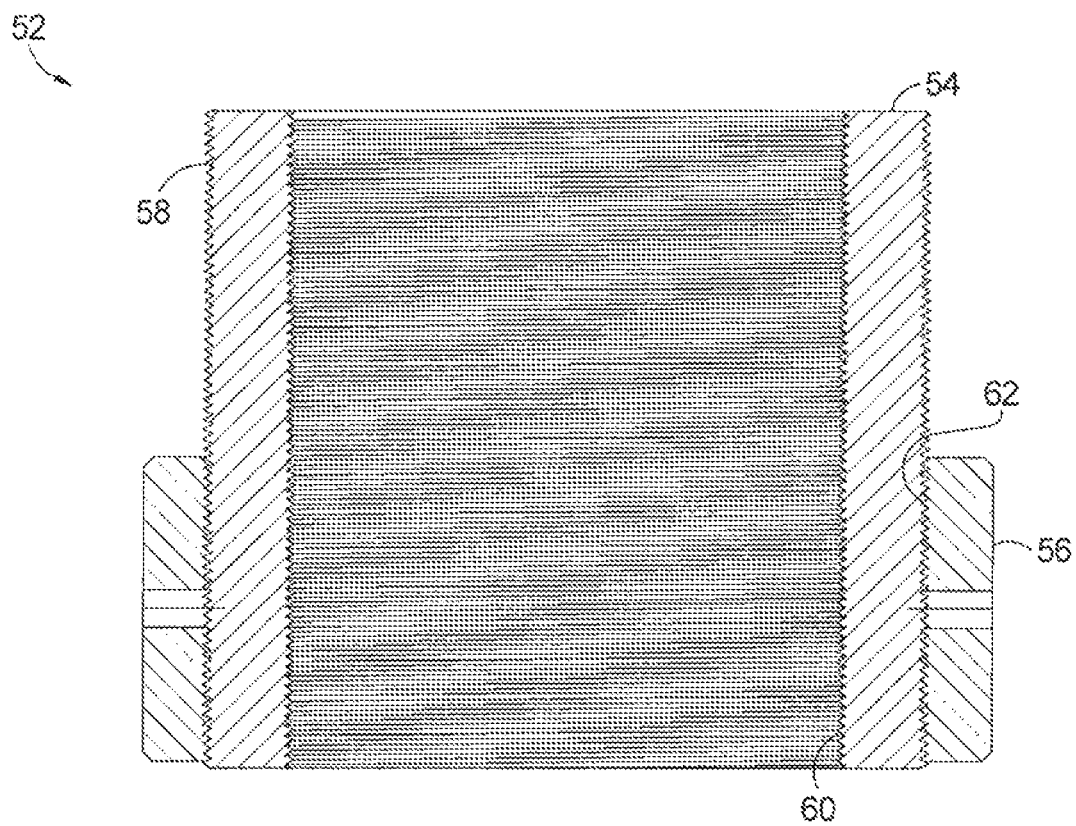
FIG. 4 is an external tensioned nut (ETN) that may be used in conjunction with the HRT system shown in FIGS. 2, 3B, and 3C.

With reference to FIG. 4, ETN 52 includes an outer nut 54 and a retaining ring 56. Outer nut 54 has internal threads 60 configured for engaging corresponding threads on the end of a stud, and external threads 58 configured for engaging both internal threads 62 formed in retaining ring 56 and internal threads formed in the female end (not shown) of puller screw 38. The threads 58, 62 on ETN 52 may be buttress threads, which provide additional capacity for tensioning by keeping more of the forces parallel to the center line of the stud. Retaining ring 56 is used to maintain the position of ETN 52 after HRT system 32 stretches the stud by applying a tension force.

As best seen in FIG. 3A, second end 50 of puller screw 38 includes an external surface 64 having threads defined therein configured for engaging threads defined in an internal surface 66 of integrated nut 42, wherein nut 42 may be threaded onto puller screw 38. In one embodiment, in order to increase the speed of assembly and disassembly of HRT system 32, the threaded connection between puller screw 38 and nut 42 may be segmented so as to produce a bayonet fit such that nut 42 can be freely slid over puller screw 38 until HRT system 32 is nearly in position, then either puller screw 38 or nut 42 turned only a partial turn to engage the corresponding threads of puller screw 38 and nut 42. It should also be understood that the threads on internal surface 66 of nut 42 may be adapted to directly engage the end of a stud 12' of a sufficient length, whereby puller screw 38 would not be included in HRT system 32.

Integrated nut 42 defines at least two axially-directed bores 68 therethrough, wherein bores 68 may be substantially parallel relative to central axis A (FIGS. 3A and 5) and may be positioned equidistant relative to one another about axis A (FIG. 2). Further, nut 42 includes external threads 70 formed on its outside surface configured for engaging corresponding internal threads 72 formed in tensioner cylinder 46. It should be understood that the threads on internal surface 66 and the threads on external surface 70 may be buttress threads. One aspect of the invention includes integrating nut 42 with tensioner cylinder 46 so that nut 42 becomes part of the tensioning mechanism, as opposed to a fastener mechanism.

In the embodiment described, nut 42 includes at least two bores 68 that receive a corresponding number of posts 74. However, it is to be understood that the present invention can be alternately configured with more than two bores defined in nut 42, including a corresponding number of posts disposed in each bore. Also, it should be understood that bores 68 may include a cross-sectional shape that matches the cross-sectional shape of posts 74, for example, but not limited to, a cylindrical, square, trapezoid cross-section.

Each of the posts 74 are received within corresponding bores 68 formed in integrated nut 42. Posts 74 have a first end 76 that is adapted to be disposed adjacent to and/or in abutting engagement with a stop surface 78 of support foot 40. Stop surface 78 of support foot 40 may be a flat surface formed of a hard material that is capable of withstanding the pressure imposed by posts 74 during the operation of HRT system 32 for even loading on support foot 40. Each of posts 74 also include a second end 80 that is disposed outside of bores 68 in a direction T, a predetermined amount outside of bores 68 and beyond nut 42 in a substantially parallel manner relative to central axis A.

As best seen in FIG. 3A, an alignment plate 82 is shown operably positioned relative to HRT system 32. Alignment plate 82 may be a substantially cylindrical member having bottom surface 84 and top surface 86. Bottom surface 84 is supported by a stepped retainer ring 88, wherein a biasing fluid pressure or a biasing member 90, such as, for example, a return spring, may be disposed between nut 42 and tensioner piston 44 that operates to bias retainer ring 88 and top surface 86 of alignment plate 82 against a bottom surface 92 of tensioner piston 44. If a biasing fluid pressure is utilized, the fluid pressure may be at a pressure level sufficient to return piston (44) to its starting position, but at a low enough pressure to avoid damage to the HRT system (32). For example, 120 pounds per square inch (psi) plant air pressure may be used as the biasing fluid pressure in HRT system 32. Alignment plate 82 defines a plurality of bores 94 which may extend entirely, or partially, through alignment plate 82 in an axial direction from bottom surface 84 toward top surface 86. Posts 74 are received and disposed within corresponding bores 94, and second end 80 of posts 74 engage bottom surface 92 of tensioner piston 44.

Tensioner piston 44 is a substantially cylindrical member that is slidingly disposed within tensioner cylinder 46. Tensioner piston 44 includes bottom surface 92, an inner surface 96, and a side/peripheral surface 98. Peripheral surface 98 defines groove 100 within which is disposed a sealing member 102, such as, for example, an elastically-deformable O-ring.

Tensioner cylinder 46 is a substantially cylindrical, cup-shaped member having sidewall 104 with an inside surface 104a, and a closed bottom 106 having inside surface 106a. Inside surface 104a at the end thereof opposite closed bottom 106 defines internal threads 72 that correspond to and engage external threads 70 of nut 42. Sidewall 104 further includes one or more bores 108 formed therein configured for receiving a corresponding number of locking members 110, for example, locking screws. Locking members 110 are threadably positioned in bores 108 and are adapted to engage the outside surface of integrated nut 42 so that the tensioner cylinder 46 and integrated nut 42 are locked together during the operation of HRT system 32.

As described above, tensioner piston 44 is disposed within tensioner cylinder 46. More particularly, tensioner piston 44 is disposed within tensioner cylinder 46 such that inner surface 96 of piston 44 faces inside surface 106a of closed bottom 106 of cylinder 46. A hydraulic chamber 112 is defined between inner surface 96 of piston 44 and inside surface 106a of closed bottom 106 of cylinder 46, and is peripherally or radially bounded by a portion of sidewall 104 of cylinder 46. Sealing member 102 sealingly engages inside surface 104a, to thereby seal hydraulic chamber 112. Closed bottom 106 defines a hydraulic port 114 through which hydraulic fluid is supplied to and/or drawn from hydraulic chamber 112. Thus, cylinder 46 and piston 44 conjunctively define a load cell of HRT system 32.

In use, the aforementioned component parts of HRT system 32 are operably disposed in relation to stud 12', for example, as seen in FIG. 5. More particularly, puller screw 38 is either directly or indirectly engaged with stud 12' as previously described, and puller screw 38 is slidably positioned within bore 47 formed in support foot 40 so that support foot 40 is coupled with flange 14a. With additional reference to FIG. 3A, the threads on internal surface 66 of nut 42 are then engaged with the threads of external surface 64 on puller screw 38. Next, posts 74 are inserted into bores 68 of nut 42, and first end 76 of posts 74 are placed against stop surface 78 of support foot 40. One end of return spring 90 is then placed in contact with an upper surface of nut 42, and retainer ring 88 is placed in contact with the other end of the return spring 90. Alignment plate 82 is then positioned on top of retainer ring 88 so that posts 74 are positioned within bores 94. Thus, alignment plate 82 aligns and supports posts 74, thereby improving load sharing between the posts. Bottom surface 92 of tensioner piston 44 is then placed in contact with second end 80 of posts 74. Internal threads 72 of tensioner cylinder 46 are engaged with external threads 70 of nut 42. Once cylinder 46 is in a desired position, locking members 110 are tightened so that they engage the outside surface of integrated nut 42 to lock cylinder 46 to integrated nut 42.

A source of hydraulic fluid is then connected to hydraulic port 114, and fluid is thereby provided to hydraulic chamber 112. As hydraulic chamber 112 fills with fluid and becomes pressurized, the fluid exerts an axially directed force that separates piston 44 and cylinder 46. Bottom surface 92 of piston 44 is placed engagement with posts 74 by the displacement of piston 44 under the hydraulic pressure within hydraulic chamber 112. Also, alignment plate 82 is positioned such that top surface 86 of alignment plate 82 may be placed in contact with piston 44. Thus, the axial position of piston 44 relative to flange 14a is established or fixed by the abutting engagement of bottom surface 92 of piston 44 with posts 74 which are, in turn, abuttingly engaged with support foot 40. As hydraulic chamber 112 is further pressurized, cylinder 46 is displaced in direction T axially away from flange 14a. As described above, cylinder 46 is fixedly positioned relative to integrated nut 42, and integrated nut 42 is threadingly engaged with puller screw 38, and thus the displacement of cylinder 46 is transferred to puller screw 38.

Integrated nut 42 is either directly or indirectly coupled with stud 12', and thus the axial force applied to nut 42 is transferred to stud 12'. This force stretches stud 12' in direction T, and is used to temporarily maintain stud 12' in its stretched or tensioned condition. As stud 12' is stretched in direction T, nut 42 and a spanner ring 116 (which is attached to nut 16a via pins 118) are displaced in direction T. While the hydraulic pressure is maintained in chamber 112, spanner ring 116 is turned down to thereby bring nut 16a into abutting engagement with flange 14a. The engagement of nut 16a with flange 14a maintains stud 12' in its stretched or tensioned condition when the hydraulic pressure is removed from chamber 112. While the HRT system 32 described above utilized hydraulic actuation to impose the tension force in stud 12', it should be understood that mechanical actuation is also within the scope of the present invention.

Figure 3B:
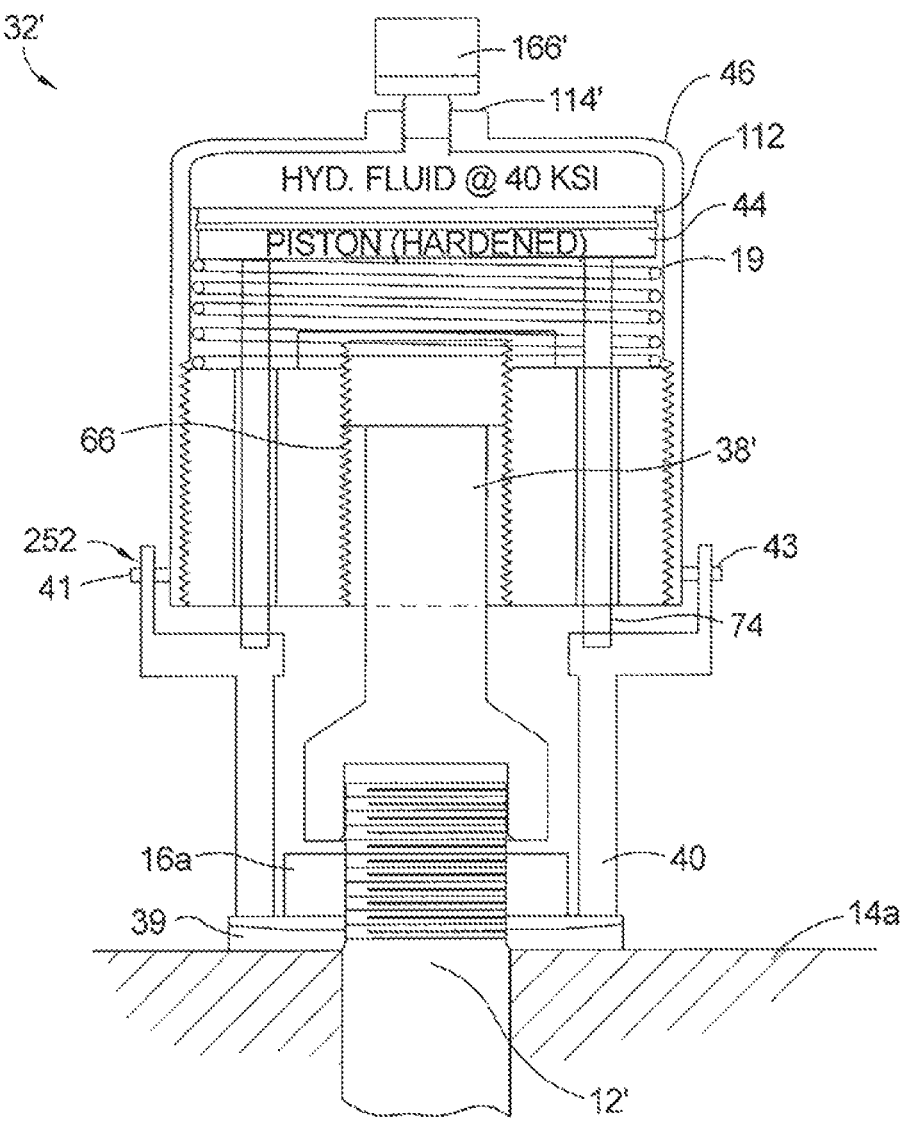
FIG. 3B is a cross-sectional view of an alternative embodiment of the HRT system shown in FIG. 3A showing an female puller screw connected to a stud.
Figure 3C:
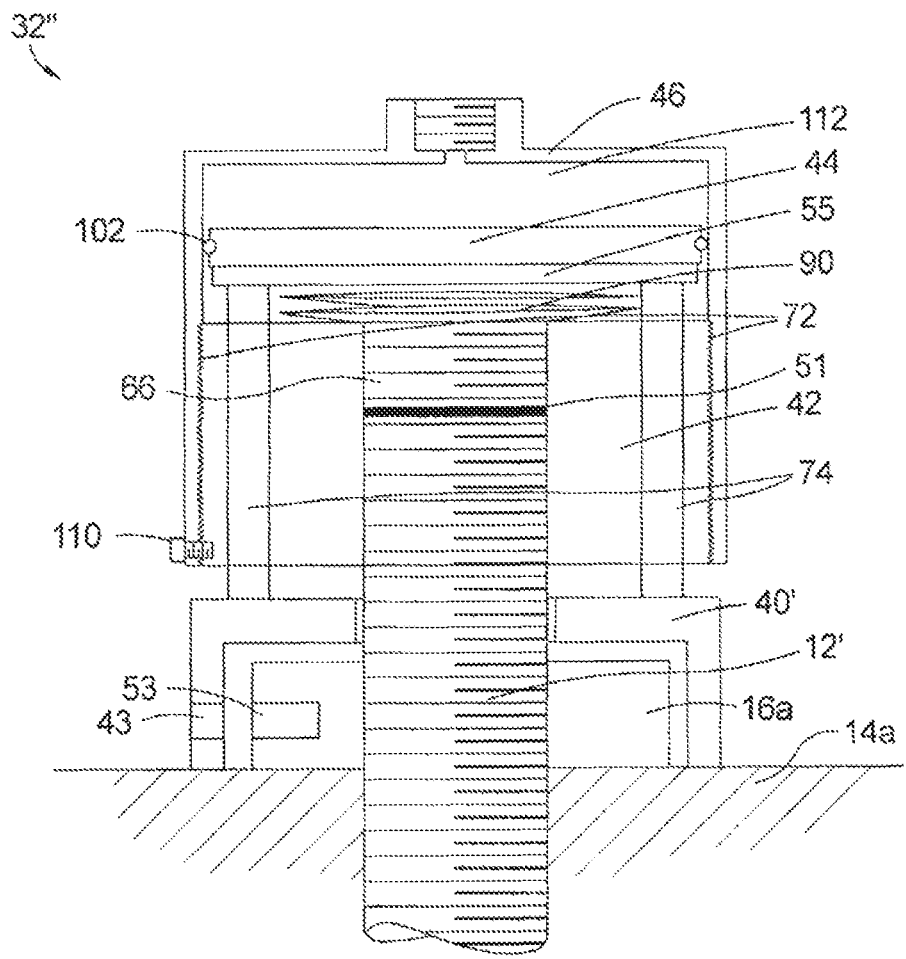
FIG. 3C is a cross-sectional view of an alternative embodiment of the HRT system shown in FIG. 3A showing the integrated nut directly coupled with a stud.

FIG. 3B illustrates an alternative embodiment 32' of the HRT system, wherein an female puller screw 38' is used to connect the HRT system 32' to threads formed in an outer surface 37 of a stud 12'. Most of the other components shown in the HRT system 32' are similar to those shown in system 32 in FIGS. 3A and 5. However, HRT system 32' may further include a hardened washer 39 disposed between the support foot 40 and flange 14a, a stroke indicator 252 which will be described in more detail below, an anti-rotation screw 41, and a cage retainer 43 disposed between cylinder 46 and support foot 40. HRT system 32' may also be provided with a female hex-type hydraulic port 114' that is adapted to be connected to a male quick connect 166' for introducing hydraulic fluid into hydraulic chamber 112.

FIG. 3C illustrates yet another embodiment 32" of the HRT system, wherein a puller screw is not used, and the stud 12' is directly connected to the integrated nut 42. In particular, the threads formed on internal surface 66 of integrated nut 42 are configured for engaging the threads formed on the outer surface of an end 51 of stud 12' to connect integrated nut 42 with stud 12'. Most of the other components shown in the HRT system 32" are similar to those shown in system 32 in FIGS. 3A and 5. However, HRT system 32" may further include a support foot 40' that includes an aperture 43 that allows access to a hole 53 defined in nut 16a so that nut 16a can be tightened during the tensioning process. Further, HRT system 32" may further include a platform 55 disposed between the posts 74 and piston 44.

Figure 6:
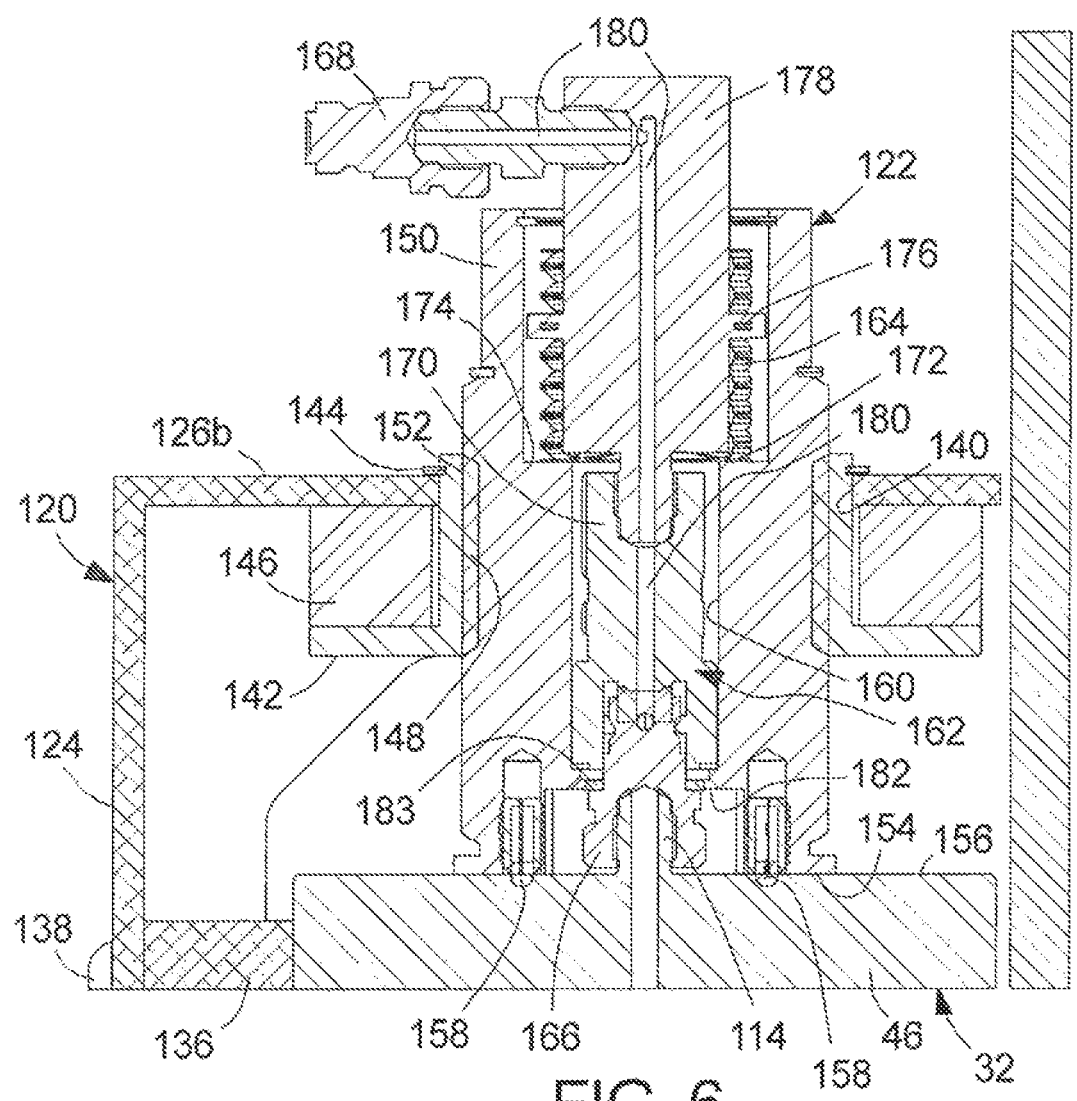
FIG. 6 is an enlarged view of a portion of FIG. 5 showing a hydraulic interlock assembly coupled to the HRT system.

In another embodiment of the present invention, as best seen in FIGS. 5 and 6, a safety guard including a guard housing 120 and a quick disconnect hydraulic interlock assembly 122 may be used in conjunction with HRT system 32, or an existing tensioning device, such as hydraulic tensioning system 10. The purpose of hydraulic interlock assembly 122 is to conduct hydraulic fluid to the tensioner cylinder 46, provide a mechanism to couple and align the guard housing 120 to the tensioning system, and prevent hydraulic pressure from being conducted to the tensioner cylinder 46 until guard housing 120 is sufficiently in place.

As best seen in FIG. 5, safety guard housing 120 includes a side wall 124 joining two end members 126a, 126b, wherein end members 126a, 126b may be positioned parallel with one another and at a perpendicular angle with respect to side wall 124. Together the side wall 124 and ends members 126a, 126b surround a substantial portion of HRT system 32, as well as the stud 12' and nut 16a, 16b assembly, to protect the user from being injured in the event that HRT system 32 malfunctions or breaks. End member 126a is located adjacent to the end of stud 12' that is opposite of tensioning system 32, and a damper block 128 is disposed between end member 126a and stud 12'. Corresponding bores 130, 132 are defined in end member 126a and damper block 128, respectively, to accommodate a locating pin 134 that fastens end member 126a to the end of stud 12'.

At least a portion of side wall 124 of safety guard housing 120 is disposed adjacent to side wall 104 of tensioner cylinder 46, and a pair of locating blocks 136 are disposed between side wall 124 and tensioner cylinder 46. Corresponding bores (not shown) are defined in side wall 124 and locating blocks 136 to accommodate pins 138 that fasten locating blocks 136 to side wall 124. Blocks 136 are used to properly locate side wall 124 relative to HRT system 32 by placing blocks 136 in contact with side wall 104 of tensioner cylinder 46.

As best seen in FIGS. 5 and 6, end member 126b is positioned such that HRT system 32 is positioned between end member 126b and stud 12'. End member 126b has a bore defined therein generally configured for having hydraulic interlock assembly 122 positioned therein. More specifically, an L-shaped ring 142 is positioned in secured engagement with bore 140 using a snap ring 144. In addition, a damper block 146 is positioned between ring 142 and end member 126b. Ring 142 includes an inner surface 148 that is threaded for securely engaging hydraulic interlock assembly 122 to safety guard housing 120.

As best seen in FIG. 6, the operation of the quick disconnect hydraulic interlock assembly 122 produces a clamping action that traps HRT system 32, stud 12' and nuts 16a, 16b onto the flanges 14a, 14b. This serves to contain these components in the event of breakage of stud 12' or internal components of HRT system 32. Hydraulic interlock assembly 122 includes a clamping member 150, such as, for example, a clamping screw or a lever with a cam type clamp, having an outer surface 152 that is adapted to be threadably engaged with inner surface 148 of bore 140. In particular, clamping member 150 is adapted to be threaded into bore 140 until a lower surface 154 abuts a top surface 156 of tensioner cylinder 46.

Interlock assembly 122 further includes a stepped axial cavity 160 defined therein that is configured for housing a female hydraulic connector 162 and a disconnect bias spring 164. Female hydraulic connector 162 mounted to guard housing 120 via hydraulic interlock assembly 122, and is adapted to receive a male connector 166 mounted on HRT system 32 to convey hydraulic fluid from a hydraulic source via a hydraulic disconnect 168, such as, for example, a hydraulic quick disconnect. Female hydraulic connector 162 may include locking balls and a collar 170 that is adapted to be slidingly disposed within cavity 160. One end 172 of disconnect bias spring 164 is disposed against a ledge 174 defined in cavity 160, and the other end 176 is attached to a coupling member 178 to bias coupling member 178 away from HRT system 32. Coupling member 178 is rigidly connected to female hydraulic connector 162 and acts as a hydraulic conduit, a hydraulic adapter and a physical extension to female hydraulic connector 162. A passage 180 allows the hydraulic fluid to be conveyed from the hydraulic source to hydraulic chamber 112 in cylinder 46. Further, clamping member 150 includes an interlock shoulder 182 that prevents sliding collar 170 from falling into position until clamping member 150 is in proper position. Shoulder 182 provides an important added condition that lower surface 154 and top surface 156 must be in contact before the hydraulic connection can be completed. In the event that the user fails to completely clamp the guard housing 120, the hydraulic pressure will be held in interlock assembly 122 and HRT system 32 will not work, thus providing a safety function. Further, spring loaded pins 158 may be disposed within clamping member 150 to prevent female hydraulic connector 162 from moving into a connectable position with male connector 166 until sufficient clamping force is generated on clamping member 150. Further, a ring 183 is fixed to male connector 166 adjacent to shoulder 182 to prevent the inadvertent connection of an unmodified female hydraulic connector 162 by preventing sliding collar 170 from sliding into place, wherein the face of female hydraulic connector 162 is machined to accommodate ring 183.

When using the safety guard housing 120 and the hydraulic interlock assembly 122 shown in FIGS. 5 and 6, the user would first position the stud 12' and nuts 16a, 16b on respective flanges 14a, 14b hand tight. Spanner ring 116 is fitted to the nut 16a, and then puller screw 38 is threaded into the end of stud 12' until tight. Next, support foot 40 is then slid over puller screw 38 and positioned to properly mate with a face of flange 14a. The remainder of the components of HRT system 32 are then threaded onto puller screw 38 as described above. Safety guard housing 120 is fitted over flanges 14a, 14b, stud 12', nuts 16a, 16b, and HRT system 32. The locating pin 134 is fitted into the back side of stud 12', and the female hydraulic connector 162 is aligned with the male connector 166. Clamping member 150 is threaded into ring 142 until sliding collar 170 on female hydraulic connector 162 snaps down and locks with male connector 166. Now that HRT system 32 is clamped tight on flanges 14a, 14b and the hydraulic connection is complete, the user may allow hydraulic fluid to pass from a hydraulic source, and through passage 180 in hydraulic interlock assembly 122 and tensioning cylinder 46, so that HRT system 32 stretches stud 12', as previously described above with respect to HRT system 32. To retain the tension load placed on stud 12', spanner ring 116 is turned so that nut 16a is in abutting engagement with flange 14a. Pressure may then be released from HRT system 32, and return spring 90 reset the position of tensioner piston 44 and posts 74. The user then turns clamping member 150 to loosen guard housing 120, and pulls collar 170 through coupling member 178 causing female hydraulic connector 162 to disengage from male connector 166, and thereby releasing the hydraulic lock. The safety guard housing 120 may now be lifted and removed from HRT system 32.

Another embodiment of a HRT system is shown in FIG. 7 and is identified with reference numeral 200. HRT system 200 is a two-stage device and generally includes a cage platform 202, an adapter ring 204, a tensioner cylinder 206, a lower tensioner piston 208, and an upper tensioner piston 210. It should be understood that adapter ring 204 is similar to integrated nut 42 as previously described.

Cage platform 202 includes a lower surface 212 that is adapted to either directly or indirectly contact a flange, such as, for example, flange 14a (FIG. 5). Cage platform 202 has a bore 214 defined therein configured to allow a stud or puller screw (not shown) to pass therethrough. Further, cage platform 202 may include two or more bores 216 adapted to allow first ends 217 of a corresponding number of posts 218 to be positioned therein.

Adapter ring 204 includes internal and external threads 220, 222, as well as bores 224 adapted to allow posts 218 to be positioned therein. Internal threads 220 are configured to allow for engagement with either a stud or a puller screw. It should be understood that internal threads 220 formed in adapter ring 204 may be adapted to directly engage the end of a stud of a sufficient length, whereby a puller screw would not be included in HRT system 200. External threads 222 are configured to allow engagement with tensioner cylinder 206 so that stud, adapter ring 204 and tensioner cylinder 206 are all fixedly positioned relative to one another during the operation of HRT system 200. Tensioner cylinder 206 further includes a hydraulic port 226.

Lower tensioner piston 208 includes a lower surface 228 and an upper surface 230. Lower surface 228 is in contact with a first return spring 232 and may be placed in abutting engagement with second ends 234 of posts 218. Further, upper tensioner piston 210 is fixedly positioned relative to lower tensioner piston 208 and extends upwardly from upper surface 230 of lower tensioner piston 208. Upper tensioner piston 210 includes a top wall 236 that is generally parallel with lower tensioner piston 208, and a downwardly extending leg member 238 that connects top wall 236 to lower tensioner piston 208. An intermediate cap 240 is fixedly coupled with tensioner cylinder 206 and is positioned between top wall 236 and lower tensioner piston 208. Intermediate cap 240 has a bore 242 formed therein configured to allow leg member 238 to extend therethrough. In addition, a second return spring 244 is positioned between intermediate cap 240 and top wall 236.

Two separate hydraulic chambers 246a, 246b are provided in HRT system 200. The first hydraulic chamber 246a is formed between lower tensioner piston 208 and intermediate cap 240, and the second hydraulic chamber 246*b* is formed between intermediate cap 240 and tensioner cylinder 206. Seals 248 (e.g., German "fit") may be positioned between intermediate cap 240 and leg member 238 of upper tensioner piston 210, between tensioner cylinder 206 and top wall 236 of upper tensioner piston 206, and between tensioner cylinder 206 and lower tensioner piston 208. A central port 250 may be formed in leg member 238 to allow for hydraulic fluid to be passed between hydraulic chambers 246*a*, 246*b*. In this particular embodiment, hydraulic pressure is conveyed through central port 250 that connects hydraulic chambers 246*a*, 246*b* which results in nearly twice the amount of force produced for a given pressure level. It should be understood that this concept should not be limited to the use of just two hydraulic chambers 246*a*, 246*b*, as the use of more than two hydraulic chambers is also contemplated and within the scope of the present invention. As would be understood by one skilled in the art, the fundamental operation of the HRT system 200 is substantially the same as was described with respect to the HRT system 32, therefore the operation of HRT system 200 will not be described an any additional detail.

HRT system 200 may further include a stroke indicator 252 which may be used to inform the user of the amount of stroke capacity that is being utilized during a tensioning cycle. Stroke indicator 252 may include at least one pin 254 mounted to and extending from tensioner cylinder 206. Pin 254 passes through an elongated slot formed in cage platform 202, wherein the outer surface of cage platform 202 has indicia indicating whether the HRT system 200 is in an extended position (E) or a retracted position (R). In addition, pin 254 operates to ensure that cage platform 202 and tensioner cylinder 206 are kept moveably attached to one another. Further, pin 254 may also extend into adapter ring 204 so that pin 254 not only operates as an indicator, but also a locking mechanism that fixedly positions cage platform 202 and adapter ring 204. However, it should be understood that pin 254 need not extend into adapter ring 204, in which case a separate locking mechanism, for example, one or more locking members 110 (FIG. 3A), would be used to fixedly position cage platform 202 to adapter ring 204.

From the foregoing, it will be seen that this invention is one well adapted to attain all the ends and objects hereinabove set forth together with other advantages which are obvious and which are inherent to the method and apparatus. It will be understood that certain features and sub-combinations are of utility and may be employed without reference to other features and sub-combinations. This aspect is contemplated by and is within the scope of the claims. Since many possible embodiments of the invention may be made without departing from the scope thereof, it is also to be understood that all matters herein set forth or shown in the accompanying drawings are to be interpreted as illustrative and not limiting.

The constructions described above and illustrated in the drawings are presented by way of example only and are not intended to limit the concepts and principles of the present invention. As used herein, the terms "having" and/or "including" and other terms of inclusion are terms indicative of inclusion rather than requirement.

While the invention has been described with reference to preferred embodiments, it will be understood by those skilled in the art that various changes may be made and equivalents may be substituted for elements thereof to adapt to particular situations without departing from the scope of the invention. Therefore, it is intended that the invention not be limited to the particular embodiments disclosed as the best mode contemplated for carrying out this invention, but that the invention will include all embodiments falling within the scope and spirit of the appended claims.

What is claimed is:

1. A tensioning system for tensioning a stud that projects from a structural member, the stud having a central axis, the tensioning system comprising: an adapter ring including internal and external surfaces, the internal surface is configured for engaging the stud, the adapter ring further including at least two axial bores defined therein; at least two posts, each of the posts having first and second ends, each of the posts disposed in a corresponding one of the at least two axial bores defined the adapter ring, each of the first ends of the posts configured for being supported by the structural member, wherein a portion each of the second ends of the at least two posts extend outwardly from the at least two axial bores of the adapter ring in a direction away from the structural member; a cylinder including a sidewall and a closed bottom, the sidewall including an internal surface configured for engaging the external surface of the adapter ring to fixedly position the adapter ring to the cylinder; a first piston movably positioned within the cylinder, the first piston configured for being supported by the second ends of the at least two posts; a second piston movably positioned within the cylinder; a leg member coupled to the first piston and the second piston; an intermediate cap fixedly coupled with the cylinder and including an aperture defined therein configured to allow the leg member to be movably positioned therein, wherein the intermediate cap is disposed between the first piston and the second piston thereby defining a first hydraulic chamber between the first piston and the intermediate cap, wherein a second hydraulic chamber is defined between the second piston and the cylinder, wherein when a hydraulic fluid is fed into the first hydraulic chamber and the second hydraulic chamber, the first and second pistons move away from the cylinder to apply a tension force on the stud.

2. The tensioning system in accordance with claim 1, wherein the leg member is fixedly coupled to the first piston and the second piston.

3. The tensioning system in accordance with claim 1, wherein the first and second pistons are spaced apart and fixedly positioned relative to each other.

4. The tensioning system in accordance with claim 1, wherein the leg member includes a central hydraulic port for placing the first and second hydraulic chambers in fluid communication.

5. The tensioning system in accordance with claim 4, wherein the cylinder includes a hydraulic port for allowing input of the hydraulic fluid into the first hydraulic chamber and into the second hydraulic chamber through the central hydraulic port.

6. The tensioning system in accordance with claim 1, further comprising a first biasing member disposed between the adapter ring and the first piston.

7. The tensioning system in accordance with claim 6, further comprising a second biasing member disposed between the intermediate cap and the second piston.

8. The tensioning system in accordance with claim 1, further comprising a second biasing member disposed between the intermediate cap and the second piston.

9. The tensioning system in accordance with claim 1, further comprising a cage platform positioned between the at least two posts and the structural member.

10. The tensioning system in accordance with claim 9, wherein the cage platform includes a first bore defined therein configured for receiving the stud, wherein the cage platform further includes at least two second bores, wherein each of the at least two second bores are configured for receiving a corresponding one of the at least two posts.

11. The tensioning system in accordance with claim 9, further comprising a pin fixedly coupled with the cylinder and extending through an elongated slot formed in the cage platform.

12. The tensioning system in accordance with claim 11, wherein a surface of the cage platform has indicia indicating the position of the cylinder relative to the cage platform.

13. The tensioning system in accordance with claim 1, wherein the at least two axial bores defined in the adapter ring are substantially parallel relative to the central axis.

14. The tensioning system in accordance with claim 1, wherein the at least two axial bores defined in the adapter ring are positioned equidistant relative to one another about the central axis.

15. A tensioning system for tensioning a stud that projects from a structural member, the stud having a central axis, the tensioning system comprising: an adapter ring including internal and external surfaces, adapter ring including at least two axial bores defined therein; a puller screw including first and second ends, the first end of the puller screw configured for engaging the stud, the second end of the puller screw configured for engaging the internal surface of the adapter ring; at least two posts, each of the posts having first and second ends, each of the posts disposed in a corresponding one of the at least two axial bores defined the adapter ring, each of the first ends of the posts configured for being supported by the structural member, wherein a portion each of the second ends of the at least two posts extend outwardly from the at least two axial bores of the adapter ring in a direction away from the structural member; a cylinder including a sidewall and a closed bottom, the sidewall including an internal surface configured for engaging the external surface of the adapter ring to fixedly position the adapter ring to the cylinder; a first piston movably positioned within the cylinder, the first piston configured for being supported by the second ends of the at least two posts; a second piston movably positioned within the cylinder; a leg member coupled to the first piston and the second piston; an intermediate cap fixedly coupled with the cylinder and including an aperture defined therein configured to allow the leg member to be movably positioned therein, wherein the intermediate cap is disposed between the first piston and the second piston thereby defining a first hydraulic chamber between the first piston and the intermediate cap, wherein a second hydraulic chamber is defined between the second piston and the cylinder, wherein when a hydraulic fluid is fed into the first hydraulic chamber and the second hydraulic chamber, the first and second pistons move away from the cylinder to apply a tension force on the stud.

16. The tensioning system in accordance with claim 15, wherein the leg member is fixedly coupled to the first piston and the second piston.

17. The tensioning system in accordance with claim 15, wherein the first and second pistons are spaced apart and fixedly positioned relative to each other.

18. The tensioning system in accordance with claim 15, wherein the leg member includes a central hydraulic port for placing the first and second hydraulic chambers in fluid communication.

19. The tensioning system in accordance with claim 18, wherein the cylinder includes a hydraulic port for allowing input of the hydraulic fluid into the first hydraulic chamber and into the second hydraulic chamber through the central hydraulic port.

20. The tensioning system in accordance with claim 15, further comprising a first biasing member disposed between the adapter ring and the first piston.

21. The tensioning system in accordance with claim 20, further comprising a second biasing member disposed between the intermediate cap and the second piston.

22. The tensioning system in accordance with claim 15, further comprising a second biasing member disposed between the intermediate cap and the second piston.

23. The tensioning system in accordance with claim 15, further comprising a cage platform positioned between the at least two posts and the structural member.

24. The tensioning system in accordance with claim 23, wherein the cage platform includes a first bore defined therein configured for receiving the puller screw, wherein the cage platform further includes at least two second bores, wherein each of the at least two second bores are configured for receiving a corresponding one of the at least two posts.

25. The tensioning system in accordance with claim 23, further comprising a pin fixedly coupled with the cylinder and extending through an elongated slot formed in the cage platform.

26. The tensioning system in accordance with claim 25, wherein a surface of the cage platform has indicia indicating the position of the cylinder relative to the cage platform.

27. The tensioning system in accordance with claim 15, wherein the at least two axial bores defined in the adapter ring are substantially parallel relative to the central axis.

28. The tensioning system in accordance with claim 15, wherein the at least two axial bores defined in the adapter ring are positioned equidistant relative to one another about the central axis.

* * * * *